United States Patent [19]

DiFrank

[11] Patent Number: 4,923,363
[45] Date of Patent: May 8, 1990

[54] LEHR LOADER PICKUP ARM

[75] Inventor: Frank J. DiFrank, Toledo, Ohio

[73] Assignee: Owens-Illinois Glass Container Inc., Toledo, Ohio

[21] Appl. No.: 401,385

[22] Filed: Aug. 31, 1989

[51] Int. Cl.$^5$ .............................................. B65G 47/26
[52] U.S. Cl. ..................... 414/752; 198/428; 198/468.4; 294/64.1; 294/65
[58] Field of Search .............. 198/428, 468.4; 294/64.1, 65; 414/752

[56] References Cited

U.S. PATENT DOCUMENTS

| | | | |
|---|---|---|---|
| 2,716,497 | 8/1955 | Wahl et al. | 294/65 |
| 3,265,182 | 8/1966 | Bargel | 198/428 |
| 3,360,102 | 12/1967 | Cummings | 198/428 |
| 3,747,784 | 7/1973 | Dean | 294/64.1 X |
| 3,826,381 | 7/1974 | Kulig et al. | 294/64.1 X |
| 3,908,812 | 9/1975 | Graff | 294/65 X |
| 4,067,434 | 1/1978 | Mumford | 198/430 X |
| 4,639,030 | 1/1987 | Bini | 294/64.1 |
| 4,850,627 | 7/1989 | Franklin | 294/64.1 X |

Primary Examiner—Robert J. Spar
Assistant Examiner—D. Glenn Dayoan

[57] ABSTRACT

Apparatus in the form of a vacuum bar for picking up a full row of newly formed glass containers from a moving conveyor on which the containers are sitting and transferring the containers onto a moving lehr mat. The container engaging system is formed of a pair of heat resistant, air impervious curtains that are supported in opposing relationship and are mounted to be movable toward and away from each other by the introduction of a vacuum to the area therebetween, from above, while they are positioned on each side of the row of containers, to cause the curtains to engage and grip the entire row of containers. The bar is moved with the containers to a position above the lehr mat and released thereto when the vacuum is interrupted, the bar elevated to clear the curtains from the containers, retracted into position above the cross conveyor and next full row of containers forming thereon preparatory to being picked by the vacuum actuated bar and curtains.

17 Claims, 5 Drawing Sheets

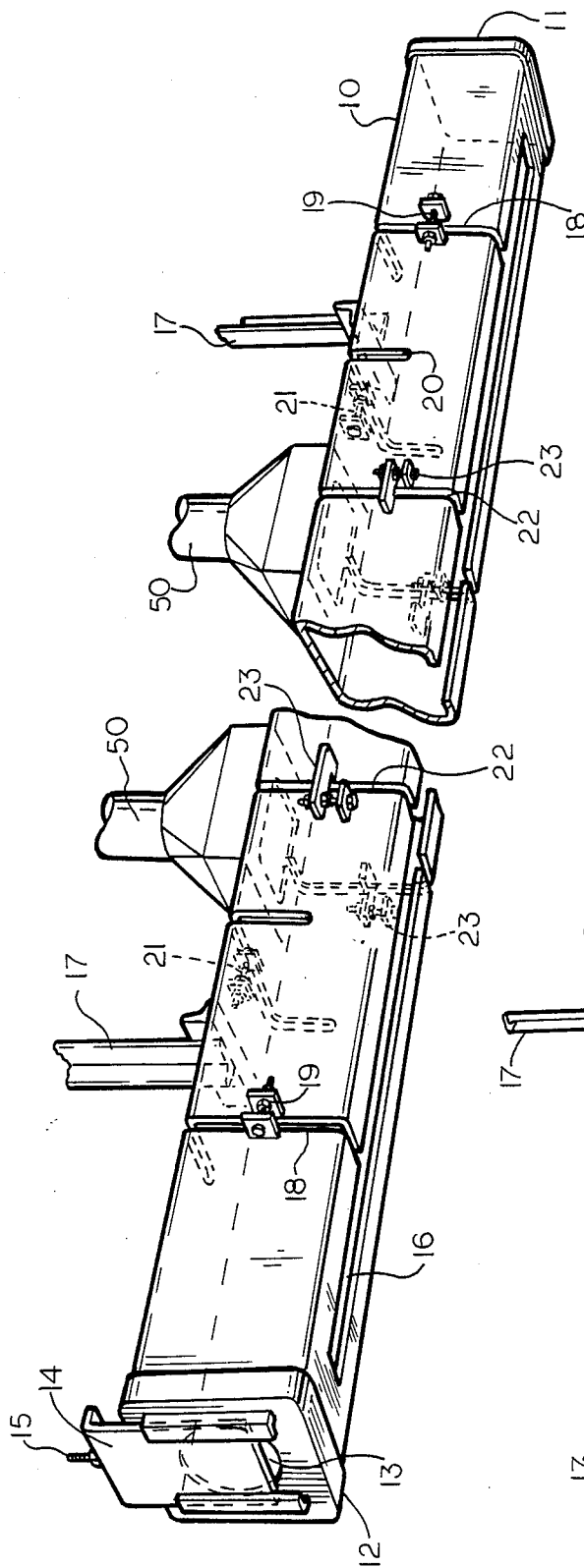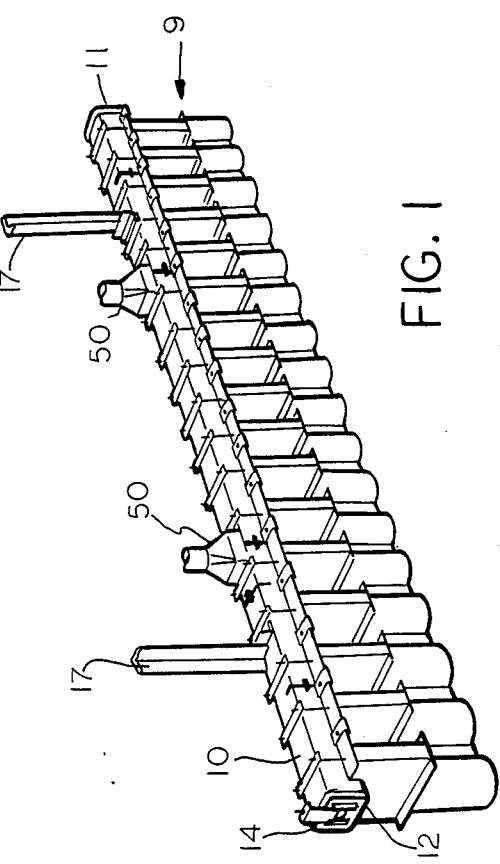
FIG. 2
FIG. 1

LEHR LOADER PICKUP ARM

BACKGROUND OF THE INVENTION

Lehr loaders, or stackers as they are sometimes termed, basically transfer a row of newly formed glass bottles that are moving at right angles to the movement of a lehr mat from a cross conveyor that is supporting the bottles by pushing the bottles sideways from the conveyor onto the end of the moving lehr mat. This transfer motion has to be coordinated with both the conveyor motion and lehr mat movement. The lehr has the function of annealing the bottles to remove any stress or strain in the glass. Where articles are produced in large quantities, it is most desirable, for efficient operation, that article handling be performed mechanically and preferably this means that the ware should be smoothly and automatically handled from the time that the ware is set out, from the forming machine onto a machine conveyor, to when the ware is transferred to a cross-conveyor. The cross-conveyor moves across the width of the lehr at the front end thereof and it is from this crossconveyor that the lehr loader or stacker moves the newly formed ware into the lehr.

In the operation of the prior art lehr loaders, where the bottles are slid from the cross-conveyor, over a dead plate and onto the lehr mat, there is a certain amount of scuffing of the bottom of the bottles. Scuffing is not a desirable attribute to bottle handling and may result in the unannealed bottle being "checked" in its bottom surface. Side engagement by a lehr bar also may cause thermal checking of the lower side of the ware when it is contacted by the metal or graphite bar. The operations of the loader, conveyors, and lehr mat must be synchronized to assure proper handling. There also is a danger of the ware contacting each other during transfer or tipping of the ware while sliding onto the lehr mat. The typical cross-conveyor is traveling at a much faster rate than the lehr mat and this distinct differential can be a defect producing situation when the forming machine is producing as many as or more than 480 bottles per minute, the nominal rate for a 10-section, quadruple cavity I.S. machine.

An example of the bottle side engaging lehr loader is disclosed in U.S. Pat. No. 4,067,434, dated May 13, 1976.

It has been suggested that the bottles may be transferred by vacuum cups which will seat on the finish of the container and lift the bottle by its neck. One problem with this sort of system is that there is a great tendency for the bottles to swing and contact each other, particularly when the bottles must be picked up and moved from the cross-conveyor at a rapid speed and then the line must be slowed down to the speed of the lehr mat when the bottles are lowered and released onto the mat. This would obviously be more pronounced when dealing with narrow-neck bottles such as used for wine and beer. Since many narrow-neck bottles are tall with small diameter necks relative to their mass grasping by the neck will create a swinging moment of inertia that acts from a point at the top of the bottle. The bottles will invariably contact each other and produce defects if the movements are rapid enough to handle the ware at the forming speeds encountered today.

When using the vacuum cup transfer where the neck is sealed by the cup, one problem is that the vacuum lifting force is supplied by the neck area only and for most bottles this will require a vacuum source of 700 to 1000 MM of water from vacuum pumps that are expensive to maintain.

A second problem with the prior art vacuum bottle transfer system is that of maintaining a seal between the line contact area of the bottle neck or finish and the vacuum cup. Most high temperature materials will rapidly wear at the finish surface contact area requiring frequent replacement and constant vigilance.

With the foregoing in view, the present invention provides a hot bottle transfer system where the bottles are picked up by a vacuum transfer bar, elevated and rapidly moved without danger of thermally shocking the bottles yet providing smooth transfer at the preselected speeds. The bottles at the time they are to be transferred may have a temperature in the range of 200°–232° C.

SUMMARY OF THE INVENTION

In order to transfer hot bottles that are moving on a crossconveyor to the moving mat of an annealing lehr, the present invention, as an object, provides a system for engaging the hot bottles by grasping the line with a pair of opposed curtains that provide sufficient gripping action therebetween to permit the lifting of the bottles from the cross-conveyor even if they are somewhat out of line and controlled, rapid movement to a position above the lehr mat where they are lowered and released onto the lehr mat in an aligned row at a precise spacing from the previously positioned row.

The gripping of the bottles is carried out with a fairly low vacuum force compared to those systems where the bottles are engaged at their necks only.

Furthermore, the system of the invention will move the bottles with great stability and avoid any possibility of the hot bottles contacting each other or being engaged by pusher members that have a thermal checking tendency.

Other and further objects will be apparent from the following detailed description taken in conjunction with the annexed sheets of drawing where:

FIG. 1 is a perspective view of the bottle gripping mechanism of the invention for a lehr loader;

FIG. 2 is a perspective view, on an enlarged scale with the center portion removed, of the vacuum manifold used in the mechanism of FIG. 1;

Figure 3:
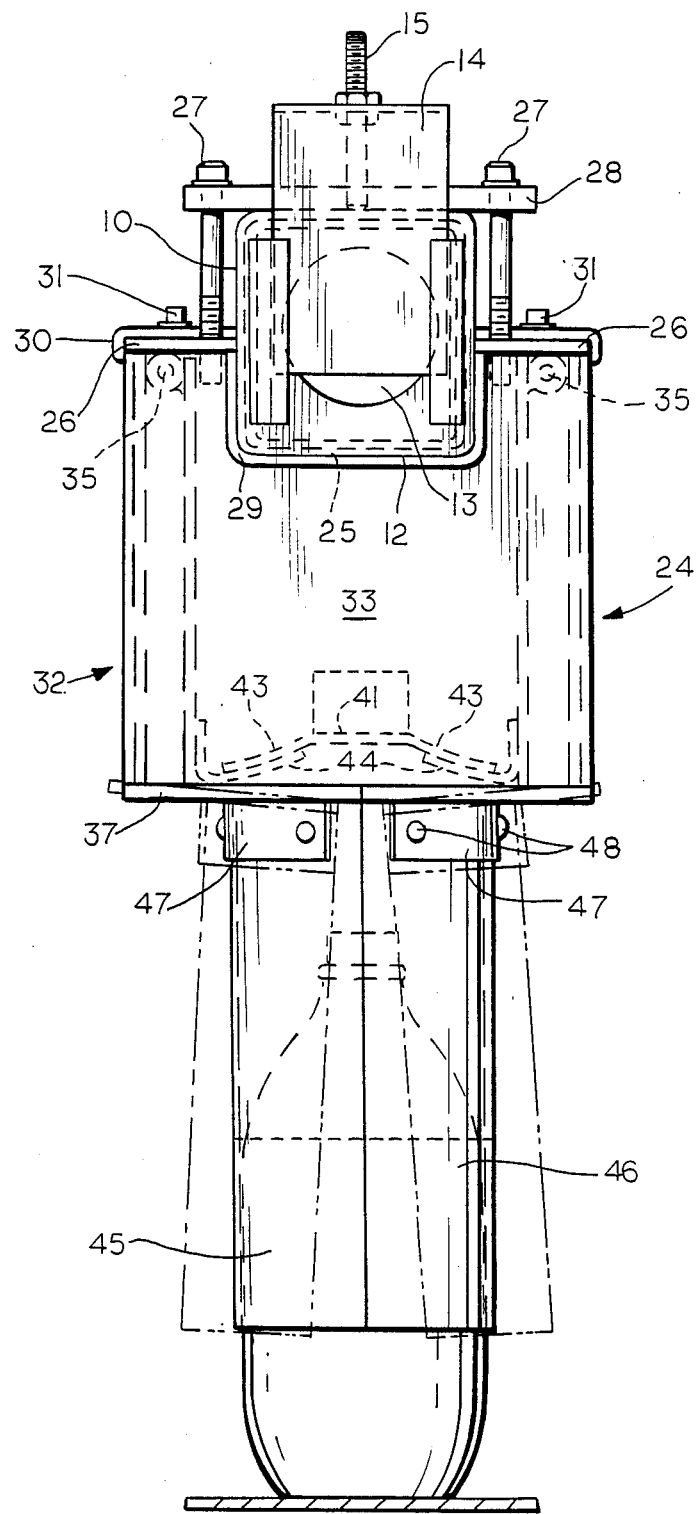
FIG. 3 is an end view, on an enlarged scale, of the apparatus of FIG. 1.

With particular reference to the drawings, a vacuum lehr loader bar 9 will be described in detail.

DETAILED DESCRIPTION OF THE DRAWINGS

A generally horizontal vacuum manifold 10 takes the form of an elongated hollow chamber having an end cap 11 closing its right hand end as viewed in FIG. 2. The opposite end is also closed by a cap 12; however, this cap is provided with an opening 13 therein. Overlying the opening 13 is an adjustable baffle plate 14 whose position is controlled by an adjusting screw 15. The plate 14, by its adjustment, can be used to control, to a certain extent, the degree of vacuum present in the manifold 10. Vacuum is applied to the interior of the manifold by at least two vacuum headers 50 that overlie openings in the top of the manifold and through which the vacuum is applied.

The lower or bottom surface of the manifold is provided with an elongated slot 16 which extends substantially the full length of the manifold. The manifold is physically supported in its operation by at least two vertically extending angle irons 17. Since the manifold is made of a fairly light, thin gauge metal such as stainless steel, it can be subject to warpage from lifting the ware in an environment where there is considerable heat. The bottles may be at a temperature of 850°- F. and the lehr which faces the vacuum transfer head or manifold may be at nearly 1000° F. Thus there is a possibility that the manifold can warp from both the load and heat. In order to assure that the bottles will be moved with precision and that the bottles are picked up, in line, and deposited on the lehr mat in line and with their bottoms square to the lehr mat, a series of adjustments may be made to the manifold to correct any such warpage. An example of such adjustments is shown in FIG. 2 where vertical cuts 18 are provided in the side of the manifold with adjusting screws 19 for widening or closing the gap to compensate for any horizontal warpage. In a like manner, horizontal cuts 20 with screws 21 provide adjustability in the vertical direction in the event the manifold may sag. Additionally, to compensate for any twist that may occur, slots 22 and screws 23 are provided which work in pairs to make the adjustments.

Figure 4:
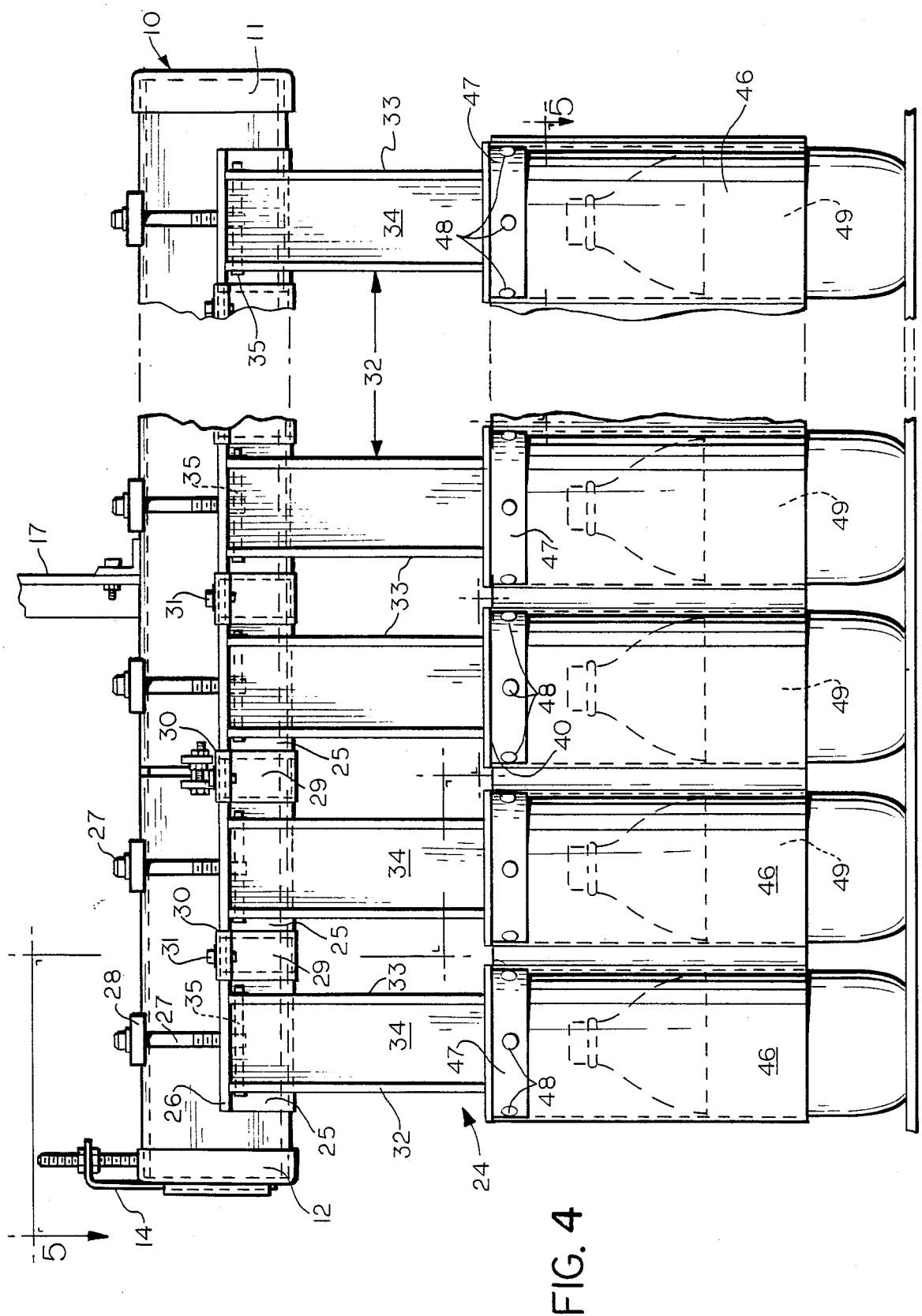
FIG. 4 is a side elevational view of the apparatus of FIG. 1, on an enlarged scale with a central portion broken out.
Figure 5:
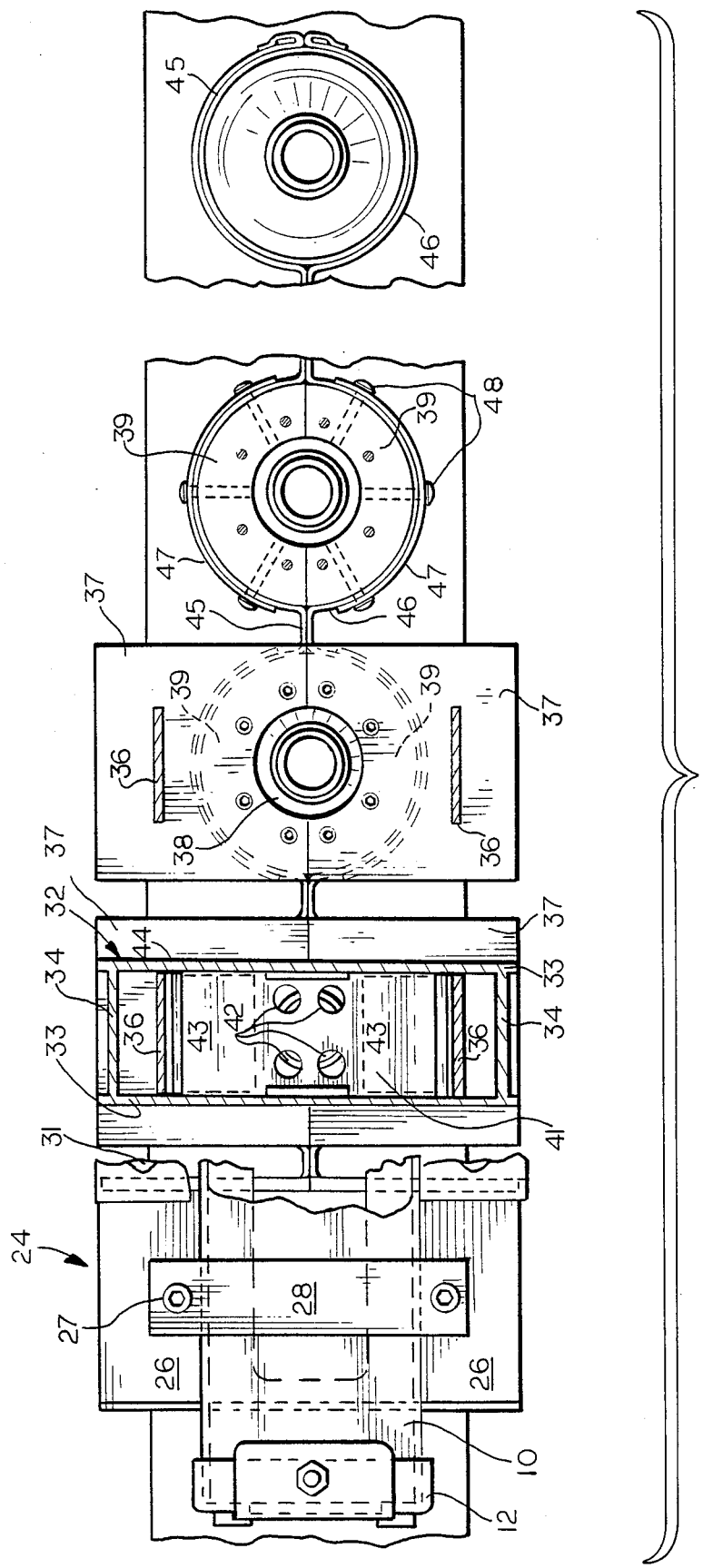
FIG. 5 is a cross-sectional view taken at line 5—5 of FIG. 4.

Beneath the manifold 10 and supported thereby are a series of pliable cloth grippers, one for each container to handle. As best seen in FIGS. 3-5, an individual gripper 24 is in the form of a "U"-shaped bracket 25 that has horizontal pieces or ears 26 at the top edge thereof which extend outwardly. A pair of threaded bolts 27 thread into the top of the ears 26 and have their heads above a bar 28 that overlies the manifold. In this way the bracket 25 is mounted to the underside of the manifold. The brackets 25 have an opening that corresponds to the slot 16 in the manifold. Each pair of adjacent brackets 25 has a generally "U"-shaped closing member 29 that is provided with clip-like ends 30 that go both above and below the ears 26 of the brackets 25. Screws 31 pass through the ends of the clips 30 and hold the members 29 clamped to the ears 26 of the brackets 25 and spanning the gap therebetween while closing off the slot area in the bottom of the manifold.

Each bracket 25 supports a rectangular box-like structure 32 formed of side walls 33 and end walls 34. The boxes 32 are closed at the top by the bracket 25 but are open at their bottoms. A horizontal pivot pin 35 extends between the side walls 33, adjacent the upper corners of the box 32. These pins 35 each pivotally support a downwardly extending, rectangular plate 36 whose length and shape closely approximate that of the end walls 34. The width of the plates 36 is such that they clear the side walls 33 of the box 32. Each of the plates 36, at its lower end, is fixed to a horizontal plate 37 which may also swing with the plate 36 about the pivot pins 35.

Any vacuum which is present in the manifold 10 will be present in the interior of the box 32, but will primarily be present within the space between the plates 36 and the walls 33. As can be seen in FIG. 5, the plates 37 are, in a sense, in pairs with each pair that is associated with a particular individual gripper 24 forming a circular opening 38. Each plate 37 carries a semi-annular mounting block 39 bolted to its undersurface 40. The opening 38 in the plates 37 will have the same size as the opening formed by the adjacent mounting blocks 39.

Overlying the opening 38, formed by the plates 37, is a horizontal baffle 41 formed with four holes 42 therethrough (See FIGS. 3 and 5) which will permit vacuum to be present in the opening 38 without letting much air leak into the interior of the box 32. The baffle is also formed with wings 43 that have a curvature with a radius that has the pivot pin as its center. A cooperating pair of wings 44 are connected to the inside of each plate 36 so as the plates 36 swing away from each other, under the force of gravity, the wings 43 and 44, in effect, keep the interior of the box 32 at substantially whatever pressure it may have; and when vacuum is applied through the manifold, they will let the plates 36 move toward each other under external atmospheric pressure without excessive leakage of air to the interior of the box 32.

The mounting blocks 39 at one side of the apparatus will support a continuous curtain 45 or strip of heat resistant cloth. In a like manner, the blocks 39 at the other side of the apparatus will support a curtain 46 of heat resistant cloth. It should be noted that the cloth pieces 45 and 46 are continuous and extend substantially the full length of the transfer head and manifold 10. While single strips of heat resistant cloth are contemplated, the cloth could be made of shorter lengths as long as they are integral units with respect to each bottle position. The cloth members 45, 46 are clamped to the blocks 39 by semi-circular straps 47 and fasteners 48.

The cloth pieces or curtains 45 and 46 may be formed of REFRASIL which remains pliable and flexible to 982° C. (1800° F). A silicon outer air barrier seal is provided over the REFRASIL and it can withstand temperatures of 288° C. (550° F.) without problems. In addition to the silicon outer air barrier seal layer, the curtains 45 and 46 are lined at their lower, bottle contact areas 49 with a wear resistant material termed NASLON which is so designed to close around the body of the bottle, thus locking it from side motion but still allowing vertical and side motion. While the entire curtain can be made of NASLON, it is fairly expensive so only the bottle gripping areas of the curtain need be made of NASLON while the balance of the curtains are made of a less expensive material.

As can readily be understood from the foregoing description, when a vacuum pump is connected to the headers 50, a flow of air from the interior of the manifold 10 will begin. Air will be drawn upward through the elongated slot 16 in the manifold and the interior of the box-like structures 32 will be subject to evacuation of air. This will result in the vertical plates 36 being moved toward each other. The plates 36 and plates 37 which support the curtains 45 and 46 will move the curtains into engagement with the bottles resulting in a gripping of a substantial surface area of each bottle. With such a large surface area of contact between the curtains and the bottles, it does not require any large amount of vacuum to provide sufficient force to hold the bottles. Even when a bottle is not present at a position, leakage of air into the manifold is restricted to the area of the holes 42 in the baffle 41.

Figure 6:
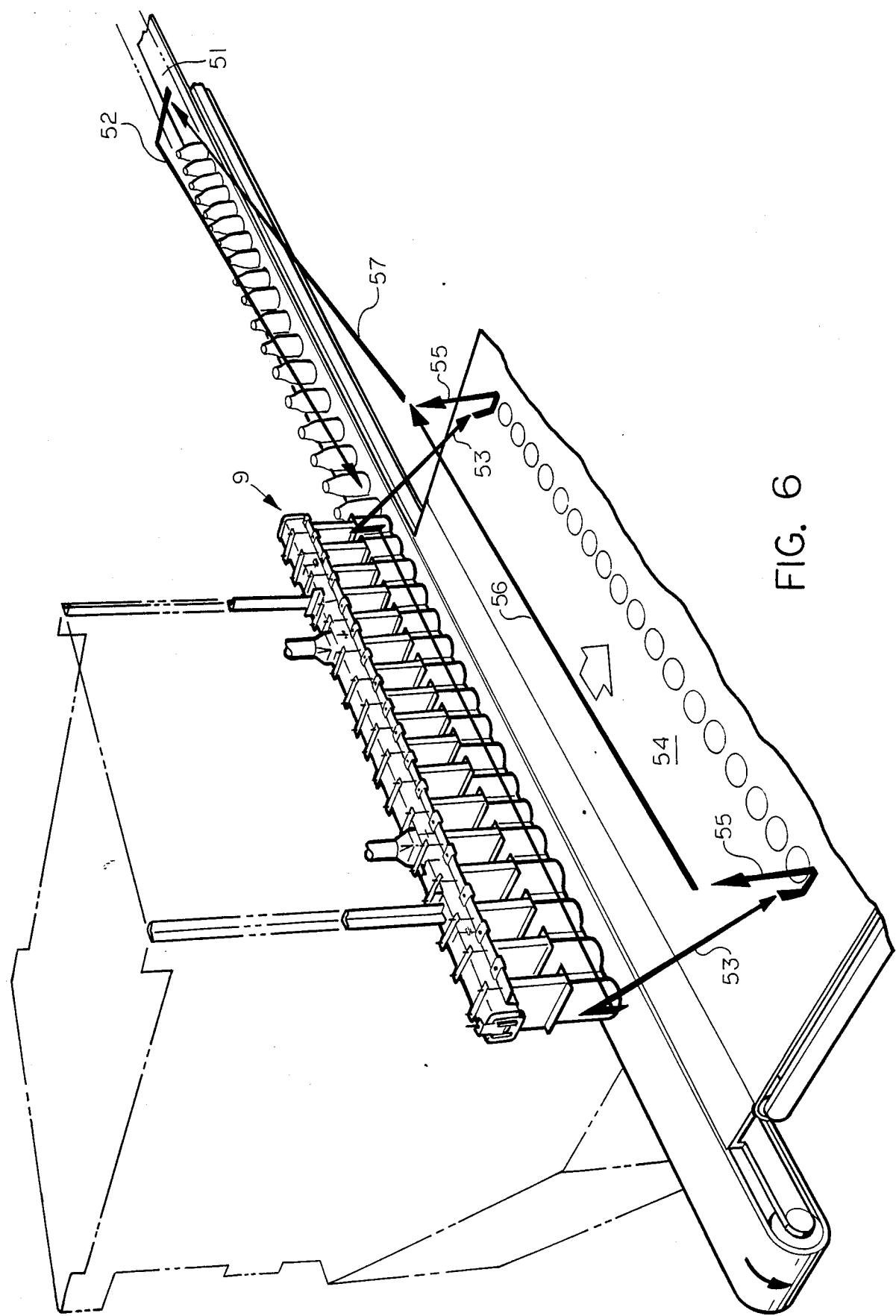
FIG. 6 is a perspective view of the mechanism of FIG. 1 in its overall environment of a lehr loader and lehr mat.

Another factor to be considered, as illustrated in Fig 6, is that the movement of the pickup bar 9 is such that it is at a raised position above the line of bottles on a conveyor 51 moving from right to left. The bar 9, under the control of a drive mechanism only schematically shown, will have its lower end follow the arrow 52 to the solid line position The vacuum is applied and the bar 9 will grip the bottles that are on the conveyor. The bar 9 is then raised and moved in the direction of the arrows 53 into position above the lehr mat 54. The bar 9 is lowered to deposit the bottles on the lehr mat by discontinuing the vacuum. With bottles sitting on the lehr mat, the bar 9 will be raised quickly to clear the top of the bottles, as illustrated by arrows 55. Once clear of the bottles, the bar 9 is returned along the path of arrows 56 and 57 to the position where, once again, the open curtains can be moved into alignment with the row of bottles on the conveyor and lowered to be ready to grasp the bottles.

It should be noted that even if the bottles are out of alignment, for as much as a 12 mm (0.5 inch), they will be pulled into line by the vacuum action on the curtains.

The curtains are designed to have a length that is determined by the diameter of the bottles to be handled. By having the bottom of the curtain spaced from the conveyor by at least the bottle diameter, down bottles will not interfere with the operation of the vacuum pickup bar 9 since downware will not be picked up.

The mechanism which handles the bar 9 is not shown in detail since it can be essentially the same as that shown in U.S. Pat. No. 4,067,434 with modifications to the cam so that the bar is moved through the vertical movements illustrated in FIG. 6 by arrows 52, 53, 55 and 56. The bar 9 of the invention will move sideways by the intervention of a horizontal motor (not shown) driving the carriage from right to left while the bar is lowered, and the motor will drive the bar back to the starting point after releasing the ware. Obviously the vacuum is applied in the proper timed sequence in the movements of the bar.

With the bar illustrated in the drawings it has been found that the sizing of the ports 42 to the pickup chamber in the boxes 32 will remain at 60 mm to 80 mm of water vacuum even when pulling in outside air. This provides power for the gathering action as well as assuring that sufficient vacuum will be maintained when bottles are missing. The adjustable expansion slits or cuts 18, 20 and 22 will provide a means to adjust out the camber and twist which will occur during the heat-up of the manifold and during operation.

The air which is passing through the system will tend to cool the apparatus to some extent. The 40 mm to 60 mm of water vacuum is less than one-tenth of that which would be required for handling bottles by their finishes only. This level of vacuum can easily be maintained by using the less expensive paddle wheel style exhausters.

While the foregoing sets forth the preferred embodiment of the invention with a few variations, other modifications may be resorted to without departing from the spirit and scope of the appended claims.

What is claimed:

1. A vacuum pickup bar for grasping hot glass containers for transferring a row of containers from a cross-conveyor to a moving lehr mat comprising, an elongated manifold, a series of individual, rectangular, box-like structures having vertical end walls mounted beneath said manifold, a pair of spaced apart, vertically depending panels of slightly lesser length and width dimension than the end walls of said box-like structure, said panels being pivotally supported from their upper edges within and spaced from the end walls of said box-like structure, a horizontal plate fixed to the lower edge of each said panel, said plates being of a size that is equal to one-half the length of the open bottom of said box-like structure and larger than the width of said structure, a pair of heat resistant and air impervious curtains, each said curtain having a length that is sufficient to extend about one-half the circumference of said row of bottles on the cross-conveyor and any gaps therebetween, means attaching the upper edge of each curtain to the horizontal plates along each side of the structure with the curtain having downwardly extending surfaces that generally parallel the semi-circular side wall of the bottles on the cross-conveyor, air baffle means in the interior of each structure for restricting air flow through the bottom of said structure, air evacuating means connected to the interior of said air manifold, and openings from the bottom of said manifold to the interior of each structure whereby the curtains suspended from the pivoted panels will be moved into gripping relationship to the sides of containers when vacuum is applied to said manifold.

2. The vacuum pickup bar of claim 1 wherein said curtains are formed of heat resistant material and the exterior is treated with silicon to render them air impervious.

3. The bar of claim 1 further including an opening at one end of said manifold, and an adjustable valve plate for closing said opening to regulate the pressure within said manifold.

4. The bar of claim 1 wherein said baffle extends across the width of said structure and is formed with arcuate ends, arcuate plates of the same curvature as the ends of said baffles, said plates fixed to the inner surface of said vertical panels in underlying, closely spaced relationship to the ends of the baffles whereby movement of said panels will not result in increased air flow into said structure.

5. The pickup bar of claim 1 wherein said manifold is formed as an elongated rectangular chamber, said openings include an elongated slot extending substantially the full length in the bottom surface thereof.

6. The pickup bar of claim 5 including means in said manifold for adjusting the longitudinal axis of said manifold to maintain it in a predetermined horizontal and vertical plane.

7. The pickup bar of claim 6 wherein said means for adjusting the axis of the manifold comprises at least two transverse cuts through the top of said manifold, two vertical cuts through the side of said manifold and means for adjusting the gap in each of said cuts.

8. A vacuum pickup bar for transferring a row of hot bottles from a machine cross conveyor to a moving lehr mat, comprising an elongated manifold, a pair of heat resistant, air impervious curtains, each said curtain having a length that is sufficient to extend the length of said row of bottles to be transferred from the cross conveyor and to extend about one-half the external circumference of each bottle, pairs of horizontal support plates equal in number to the bottles to be transferred and extending in equispaced series the length of said manifold, means pivotally mounting each individual support plate to the manifold, each support plate having an external configuration in the form of a semi-circle, means mounting each curtain to a respective row of support plates, said pivot means for each support plate having a pivot axis which is parallel to the length of the curtain, means connected between said manifold and the interior of said support plates for generally confining vacuum in said manifold to the area between said curtains and the pivotal supports therefor and means applying a vacuum operably connected to the manifold, whereby vacuum in the manifold will move the curtains toward each other to grasp the entire row of bottles and means for moving the manifold and grasped bottles, as a unit, from the conveyor and release the bottles on the surface of the lehr mat.

9. The vacuum pickup bar of claim 8 wherein said curtains are formed of heat resistant material and the exterior is treated with silicon to render them air impervious.

10. The bar of claim 8 further including an opening at one end of said manifold, and an adjustable valve plate for closing said opening to regulate the pressure within said manifold.

11. The pickup bar of claim 8 wherein said manifold is formed as an elongated rectangular chamber, an elongated slot extending substantially the full length in the bottom surface thereof.

12. A vacuum pickup apparatus for grasping a row of newly formed glass containers, and laterally transferring the row of containers onto a moving lehr mat, comprising a generally horizontal vacuum header having a length equal to the row of containers to be transferred, a longitudinally extending opening in the bottom of said header, a plurality of rectangular, vertical chambers attached to the bottom of said header in equispaced series extending the length of said header, said chambers being open at their bottoms and communicating with the interior of the vacuum header at the top thereof, a pair of generally horizontal half plates each of said pairs loosely closing one-half of the bottom of each chamber, opposed vertical walls supporting each half plate, each said vertical wall pivoted at its upper end to a horizontal pivot pin extending across the width of said chamber, each said vertical wall hanging generally parallel to and spaced inwardly of a respective end wall of the chamber, a semi-annular boss fixed to the underneath of each half plate, a vertical curtain extending throughout the length of said header and fastened to each of the semi-annular bosses to form a continuous, downwardly extending curtain, each said boss having an external dimension that approximates the circumferential dimension of a bottle half, means for applying vacuum to the interior of said header and the interior of said chambers to move the opposed vertical walls toward each other and the curtain supported thereby, and means for moving the header over the row of containers and lowering the header so the curtains will close about and grip the sides of the row of containers.

13. The vacuum pickup bar of claim 12 wherein said curtains are formed of heat resistant material and the exterior is treated with silicon to render them air impervious.

14. The bar of claim 12 further including an opening at one end of said header, and an adjustable valve plate for closing said opening to regulate the pressure within said header.

15. The pickup bar of claim 12 wherein said header is formed as an elongated rectangular chamber, said opening includes an elongated slot extending substantially the full length in the bottom surface thereof.

16. The apparatus of claim 12 further including a horizontal baffle having at least one opening therein extending above the opening formed by an opposed pair of said bosses.

17. The apparatus of claim 16 wherein said baffle extends across the width of said structure and is formed with arcuate ends, arcuate plates of the same curvature as the ends of said baffles, said plates fixed to the inner surface of said vertical walls in underlying, closely spaced relationship to the ends of the baffles whereby movement of said walls will not result in increased air flow into said structure.

* * * * *